United States Patent [19]

Robinson et al.

[11] Patent Number: 5,464,240

[45] Date of Patent: Nov. 7, 1995

[54] HOLLOW SHELL FRAMES FOR BICYCLES AND OTHER HUMAN-POWERED VEHICLES AND METHOD FOR MAKING SAME

[75] Inventors: Alexander J. Robinson, Salt Lake City; Christopher O. Paragas, Kearns, both of Utah

[73] Assignee: Genesis Composites, L.C., Salt Lake City, Utah

[21] Appl. No.: 189,590

[22] Filed: Jan. 31, 1994

[51] Int. Cl.⁶ .......................... B62K 19/16; B62K 19/18
[52] U.S. Cl. ...................... 280/281.1; 280/288.3
[58] Field of Search .................. 280/274, 281.1, 280/288, 288.3, 275, 283; 285/419, 373

[56] References Cited

U.S. PATENT DOCUMENTS

| | | | |
|---|---|---|---|
| 3,533,643 | 10/1970 | Yamada | 280/281.1 |
| 4,067,589 | 1/1978 | Hon | 280/278 |
| 4,548,422 | 10/1985 | Michel et al. | 280/288.3 |
| 4,550,927 | 11/1985 | Resele | 280/281.1 |
| 4,593,929 | 6/1986 | Williams | 280/650 |
| 4,865,337 | 1/1989 | Disler | 280/7.1 |
| 5,011,172 | 4/1991 | Bellanca et al. | 280/288.3 |
| 5,092,614 | 3/1992 | Malewicz | 280/11.22 |
| 5,253,888 | 10/1993 | Friedrich | 280/250.1 |

FOREIGN PATENT DOCUMENTS

| | | | |
|---|---|---|---|
| 895046 | 1/1945 | France | 280/281.1 |
| 448310 | 3/1950 | Italy | 280/281.1 |
| 19193 | of 1895 | United Kingdom | 280/281.1 |

Primary Examiner—Margaret A. Focarino
Assistant Examiner—Kevin Hurley
Attorney, Agent, or Firm—Daniel P. McCarthy

[57] ABSTRACT

A hollow shell frame for bicycles and other human powered vehicles is disclosed. The frame is constructed from plastic molded partial shells that are assembled into tubing that comprises the frame. The partial shells have protrusions and receptacles joining faces of their skins that are used to join the shells together to form the tube. This results in a lightweight, durable and aesthetically pleasing frame. In an alternative embodiment, the partial shells have protrusions and receptacles within their interiors for additional strength. Additional fasteners such as screws, bolts or rivets may be used for reinforcement of the partial shells. A method for manufacturing the frame is also disclosed.

26 Claims, 5 Drawing Sheets

HOLLOW SHELL FRAMES FOR BICYCLES AND OTHER HUMAN-POWERED VEHICLES AND METHOD FOR MAKING SAME

BACKGROUND OF INVENTION

A. Field of Invention

This invention relates to the field of lightweight, durable, molded frames for bicycles and other human-powered vehicles. More particularly, this invention relates to frames comprising a plurality of partial shells that have been molded from composite materials and that can be assembled to form a unitary monocoque frame that is strong, durable and lightweight. This invention also relates to a method for making the frame.

B. The Background Art

In the prior art, the structural frames of lightweight, human-powered vehicles such as bicycles, wheelchairs and the like have typically been made according to three methods: (1) Joined tubing, (2) inflation cured shells, and (3) truss structures.

1. Joined Tubing.

Joined tubing frames typically consist of metal tubing (such as steel, aluminum, titanium, etc.) that is either (1) brazed or adhesively bonded into lugs, or (2) miter-cut and welded tube-to-tube. Alternatively, joined tubing frames may be made of fiber-reinforced plastic (i.e. composite or "FRP") tubing that is adhesively bonded into lugs. Another common method of manufacturing frames from FRP tubing consists of forming composite lugs over pre-fabricated composite tubing.

Each of these methods of manufacturing frames from tubing is labor intensive, difficult to automate and therefore expensive. These methods also result in frames that are heavy because of the structural inefficiency of the joints of the frame. The joints are structurally inefficient because in order to achieve desired strength tolerances, tubing in the vicinity of the joints must be thick in comparison with the tubing at the center of the tube. Dual-thickness tubes such as these are referred to in the art as "double butted tubing" and add substantial weight to the resulting frame. Also, the lugs or joints into which the tubing is bonded or brazed must be relatively thick and hence heavy because the bending and torsional loads are inefficiently transferred to the lugs or joints from the non-integral tubing. The joined tubing frames made by these methods are unattractive to some users because of the angular, geometric appearance as opposed to more desirable smooth, flowing lines.

2. Inflation-Cured Shells.

Frames for lightweight vehicles may also be constructed by a method that eliminates tubing and joints, and results in a one-piece hollow shell, referred to in the art as a "monocoque" frame. The method uses composite materials consisting of a combination of structural fibers (such as carbon fiber and fiberglass) and thermoset resins (such as epoxy). When practicing the method, the fibers and resin are placed around an inflatable bladder (made from materials such as nylon film) or an expandable material (such as a heat-expandable foam). The assembly is placed in a cavity mold, and either the bladder is inflated or the expandable material naturally expands from the heat applied to cure the thermoset resin. This inflation or expansion presses the fiber and resin against the cavity mold walls conforming it to the shape of the mold during the curing of the resin. The mold is opened after the cure is complete, and the inflatable bladder or the expandable material permanently remains on the interior of the vehicle frame.

While this method eliminates joints and hence would seem to have the potential to reduce weight, it introduces other weight-increasing factors which offset the potential weight savings. The fibers are only strong in the fiber direction, and fibers are generally only available in single direction tape or two-direction (woven) cloth. In order for loads on the frame to be properly carried, the fiber must be plied in a number of layers, each in a different directional orientation. The end result is a significant thickness of the frame walls, especially in areas of the frame which are angled or bent (typically the same places on a frame which would be joints in a joined tubing frame), resulting in a frame which is heavy. Frames made by this method are typically brittle and subject to cracking from use and even shattering on impact, giving them a shorter product life compared to the invented frame. Also, frames made by this method are typically even more expensive to produce than joined-tubing frames because the process is very labor intensive and the amortized mold costs are very high since a mold can produce only one part every few hours. The frames made by this method can be very attractive, however, due to the flowing lines around the angles and bends.

2. Truss Structures.

Frames for lightweight vehicles may also be manufactured in a truss structure configuration. Generally a truss structure is comprised of a plurality of plate members that are each parallel to each other in a first direction, but may be of any thickness or shape in the second and third dimension. Typically the plates are parallel to each other in a first direction and thick in that direction, with different plates being thick and thin in second and third directions of varying orientation. This provides the frame with strength and rigidity in all three directions while resulting in a frame that can be injection molded and is lightweight.

Truss structure frames are inexpensive to manufacture, structurally sound, durable and lightweight, but users may have three basic objections to their use. First, the exposed edges of the thin truss structure plates are more subject to damage than are round-tubed or hollow-shelled structures. This may be a particular concern on vehicles that undergo use in extreme conditions, such as mountain bikes. Second, the appearance of the open truss structure is not attractive to some users because they prefer to smooth flowing lines of tubing. Third, the open truss structure can collect dirt, mud, debris, etc., and be difficult to clean because of limited access to the crevices of the truss structure. Round-tubed or hollow-shelled structures collect less dirt, mud, and debris and are easy to clean because dirt, mud, and debris can collect only on easily accessible areas.

SUMMARY OF INVENTION

The object of this invention is to provide a frame for a lightweight vehicle which is inexpensive to manufacture, lightweight, strong, durable, long-lasting, aesthetically attractive, free of exposed sharp edges, free of areas which would trap dirt, mud, and debris, and easy to clean. These objects are achieved by a vehicle frame that is molded as two or more partial shells (sometimes half shells) which, when joined together, form an externally complete hollow shell. In the preferred embodiment the exterior of the shell is smooth and continuous with no sharp edges, resembling prior art tubing or monocoque construction. The shell includes interior structural reinforcing members that both facilitate easy assembly of the partial shells with each other and that strengthen the resulting frame. In the preferred embodiment, the partial shells can be injection molded and then joined with glue resulting in an inexpensive and efficient manufacturing process and a high-strength, low-cost, attractive end-product.

DESCRIPTION OF THE PREFERRED EMBODIMENTS a. The Frame

Figure 1:
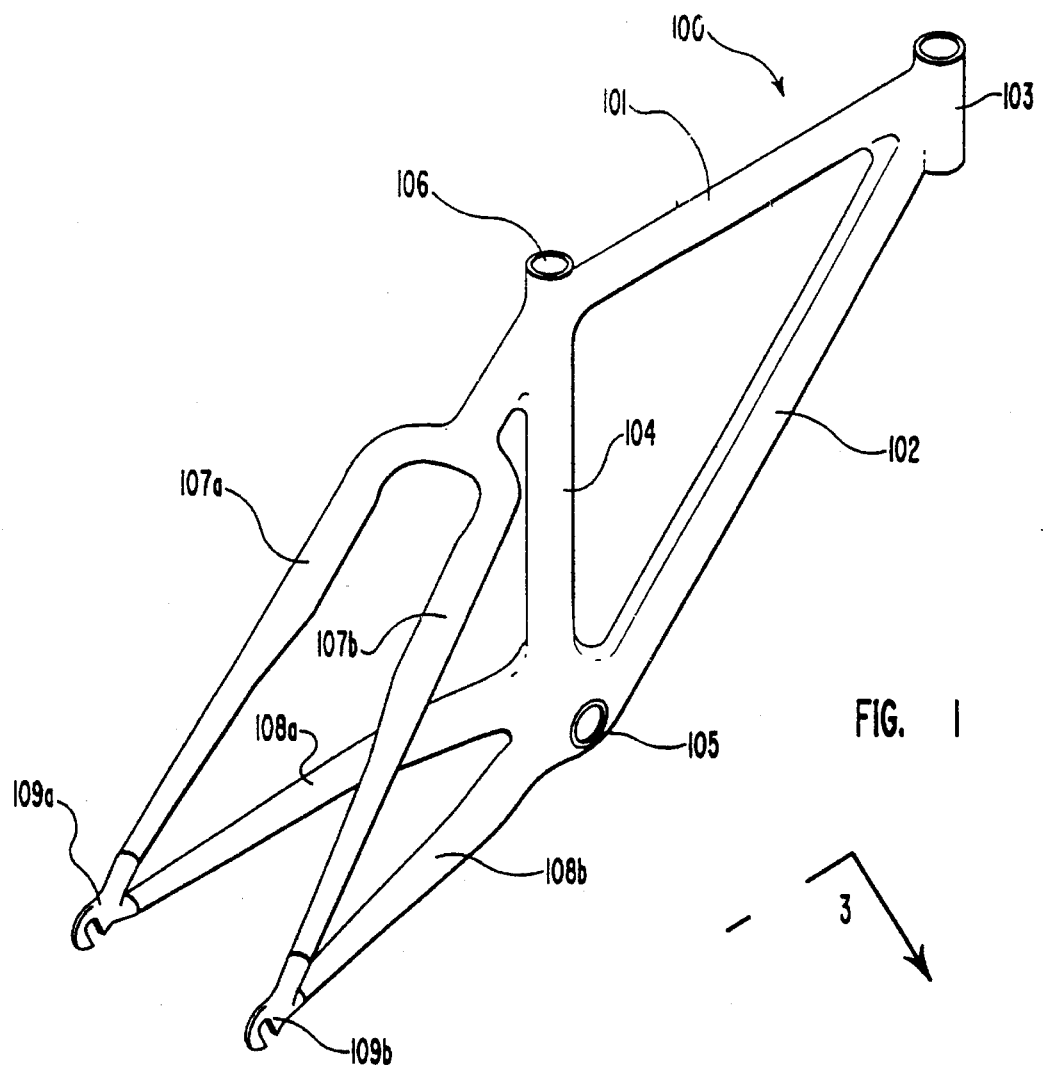
FIG. 1 depicts a perspective view of one preferred embodiment of a mountain bike frame of the invention.
Figure 2:
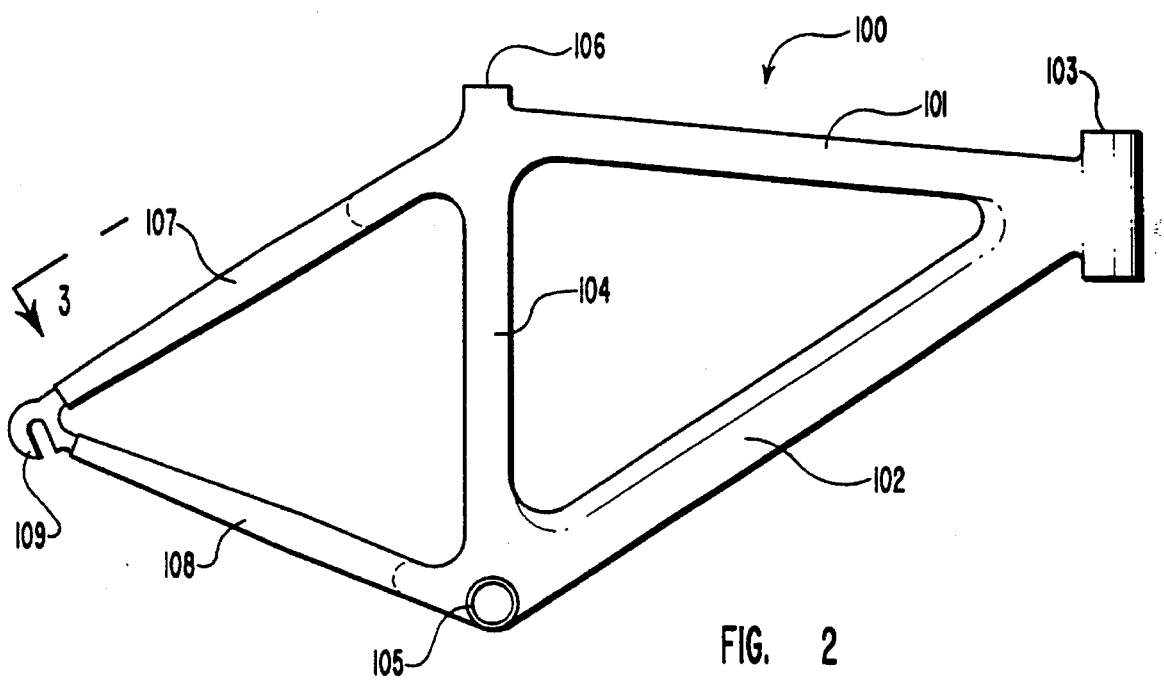
FIG. 2 depicts a side view of the frame of FIG. 1.

FIG. 1 shows an assembled all-terrain bicycle frame 100 of one preferred embodiment of the invention, commonly referred to in the art as a mountain bike frame. The frame comprises the following elements: a top tube 101, a down tube 102, a head tube 103 (into which a fork is to be mounted), a seat tube 104, a bottom bracket 105, a seat post receptacle 106, left and right seat stays 107a and 107b respectively, left and right chain stays 108a and 108b respectively, and left and right rear axle dropouts 109a and 109b respectively. The dropouts 109 are typically metal and are not a part of the invented frame. FIG. 2 shows a side view of the assembled frame 100 of FIG. 1 with a section 3—3 indicated. The existence and general arrangement of these elements is known in the art and not considered to be the invention. The invention is expressed in the particular structural characteristics of these elements and the method for making a bicycle frame to provide those characteristics.

Figure 3:
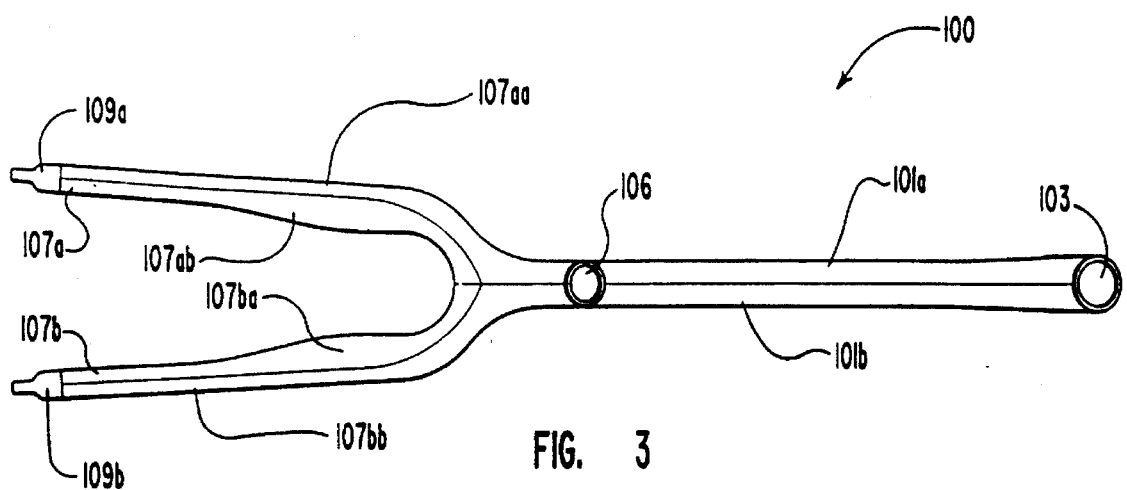
FIG. 3 depicts a view of the frame of FIG. 2 at 3—3.
Figure 4:
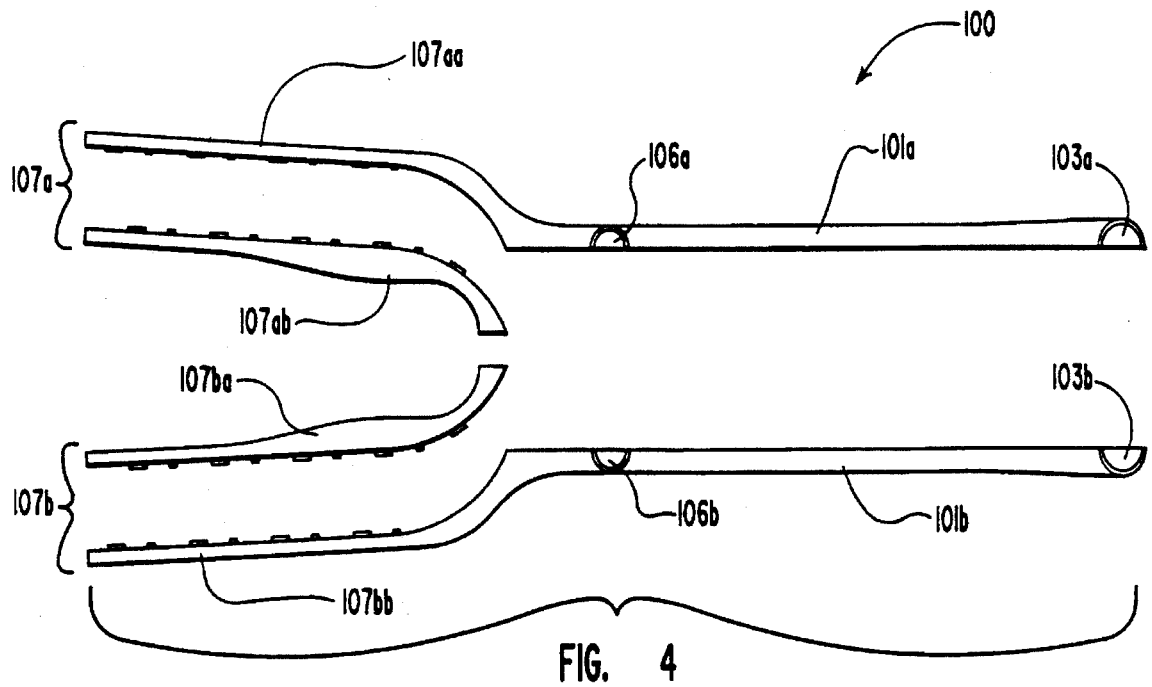
FIG. 4 depicts an exploded (unassembled) top view of the frame of FIGS. 1–3.

FIG. 3 shows a top view of the assembled frame 100 of FIGS. 1 and 2. FIG. 4 shows an exploded (unassembled) top view of the assembled frame 100 of FIGS. 1–3. From FIGS. 3 and 4 it can be seen that the frame 100 is constructed from a left main partial (or half) shell 101a and a right main partial shell 101b. Similarly, each of the seat stays 107a and 107b comprises an inner seat stay shell and an outer seat stay shell. Left seat stay 107a has a left outer seat stay shell 107aa that is integral with left main shell 101a. Right seat stay 107b has a right outer seat stay shell 107bb that is integral with right main shell 101b. Left seat stay 107a also has a left inner seat stay 107ab that is a separate partial shell from the left main shell 101a and that can be assembled with the left outer seat stay 107aa as shown in FIG. 3. Right seat stay 107b also has a right inner seat stay 107ba that is a separate partial shell from the right main shell 101b and that can be assembled with the right outer seat stay 107bb as shown in FIG. 3.

Figure 3A:
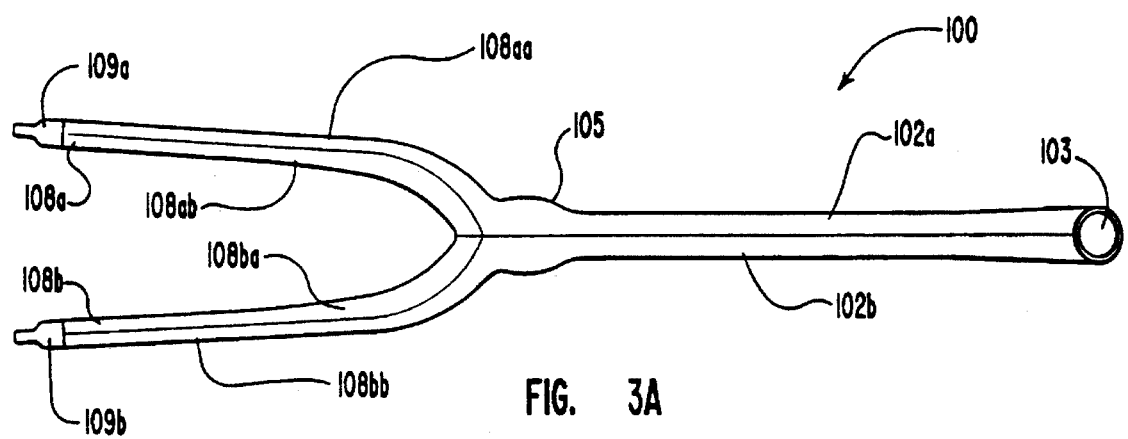
FIG. 3a depicts a bottom view of the frame of FIGS. 1, 2 and 3.

Similarly, the frame 100 has left and right chain stays 108a and 108b (shown in FIGS. 3a) whose construction and componentry is very similar to that of left and right seat stays 107a and 107b. Left chain stay 108a has a left outer chain stay shell 108aa that is integral with left main shell 101a. Right chain stay 108b has a right outer chain stay shell 108bb that is integral with right main shell 101b. Left chain stay 108a also has a left inner chain stay 108ab that is a separate partial shell from the left main shell 101a and that can be assembled with the left outer chain stay 108aa. Right chain stay 108b also has a right inner seat stay 108ba that is a separate partial shell from the right shell 101b and that can be assembled with the right outer chain stay 108bb.

As described and as shown in FIGS. 1–4, the frame of this preferred embodiment of the invention is constructed from six partial shells: left main shell 101a and right main shell 101b which are joined in the assembled frame, two inner seat stays 107ab and 107ba that are joined to the outer seat stays 107aa and 107bb of the main shells 101a and 101b respectively, and two inner chain stays 108ab and 108ba that are joined to the outer chain stays 108a aand 108bb of the main shells 101a and 101b respectively. The result is a bicycle frame 100 that can be manufactured by injection molding six separate partial shell components and then assembling the components. The division of the frame 100 into the six separate assemblable elements described above and shown in FIGS. 3 and 4 has been chosen in this preferred embodiment of the invention to facilitate manufacturing the frame by low-cost injection molding and to achieve the other objects of the invention. Other divisions of the frame 100 into a different set of elements would be considered to comprehended within the scope of the invention. For example, top tube 101 could be divided into three or four partial shells instead of just two as shown and described.

Figure 5:
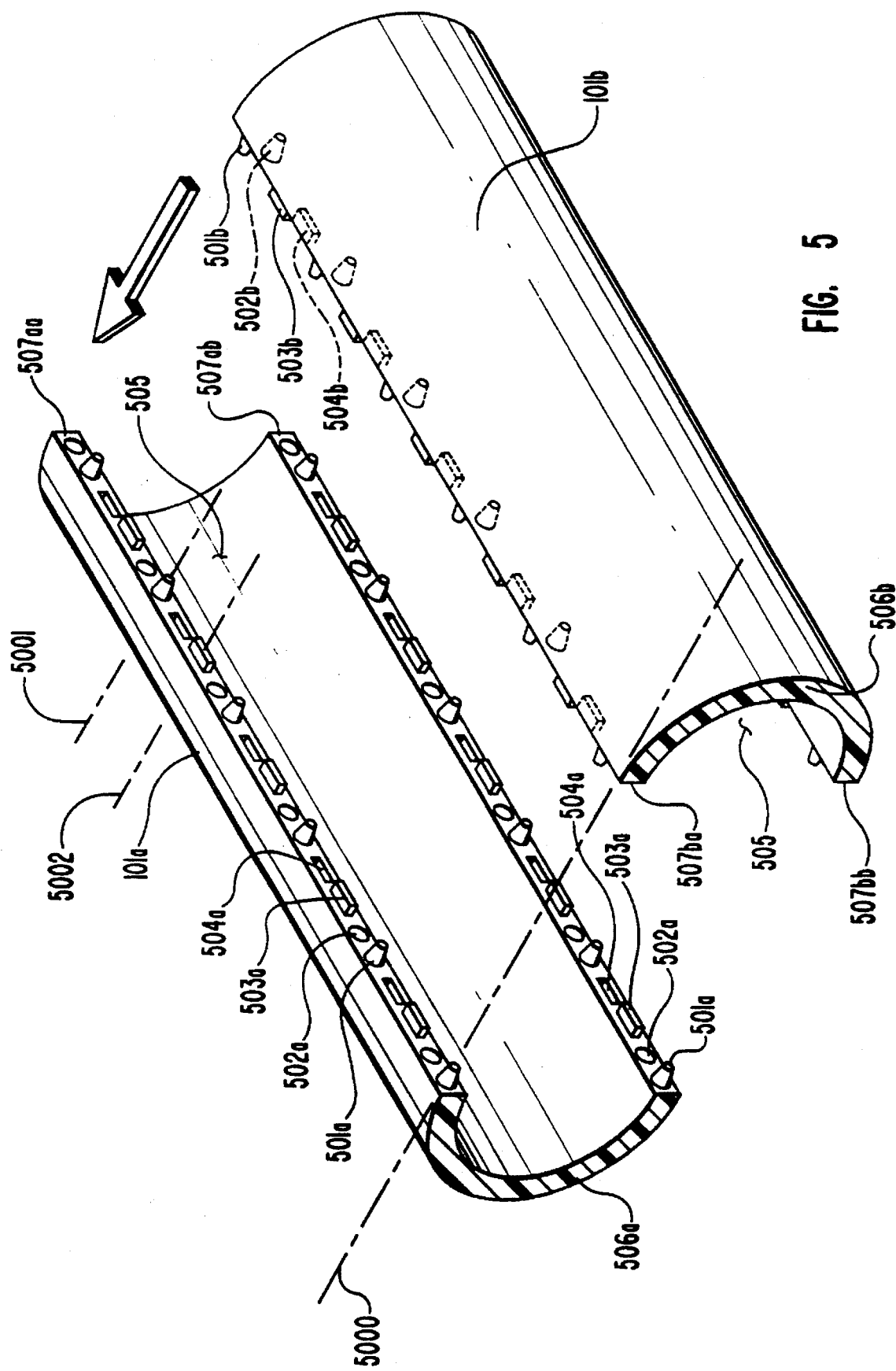
FIG. 5 depicts a side view section of one preferred embodiment a partial (half) shell of the top tube depicted in FIGS. 1–4.

FIG. 5 depicts a perspective view section of one preferred embodiment a partial (half) shell of the top tube 101. The top tube 101 portion of the left main partial shell 101a is depicted. It can be seen from the figure that the top tube 101 in this preferred embodiment has a void on its interior 505 or is hollow along its length. The partial shell 101a structure is provided by an outer tube skin 506a which has a series of protruding cones 501a, cone receptacles 502a, protruding tabs 503a and tab receptacles 504a spaced along its length on its tube skin joining faces 507aa and 507ab. The corresponding partial shell 101b structure is provided by an outer tube skin 506b which has a series of corresponding cones 501b, cone receptacles 502b, tabs 503b and tab receptacles 504b spaced along its length on its tube skin joining faces 507ba and 507bb. When the two partial shells 101a and 101b are joined, the joining faces 507aa and 507ba form a seam and joining faces 507ab and 507bb form a seam. Also depicted in FIG. 5 are the tangent 5000 to the tube 101, the center axis 5001 to the cones 501a, and the center axis 5002 to the tabs 503a. In various embodiments of the invention, the joining faces of the various structural elements of the tube may be situated at different angles. For example, a joining face could be at an angle of about 45 to 135 degrees to the tangent of the exterior surface of the assembled tube at the point where the joining face and the exterior surface meet. Alternatively, angles in the range of 60 to 120 degrees or 80 to 110 degrees could be used. A plane is formed by the two parallel seams that is called the joining plane. The two partial shell structures 101a and 101b may be joined by causing the cones 501a to enter into and firmly engage with the corresponding cone receptacles 502b. Similarly, the cones 501b should enter into and firmly engage with the corresponding cone receptacles 502a. The tabs function similarly, with tabs 503a entering into and firmly engaging with corresponding tab receptacles 504b, and tabs 503b entering into and firmly engaging with corresponding tab receptacles 504a. In the preferred embodiment, the faces of the cones and tabs that will contact corresponding faces of the cone and tab receptacles are constructed so that the cone and tab contact faces are at a slightly greater angle from their center axis than the contact faces of the corresponding receptacles. This causes the cone and tab contact faces to be in firm, pressurized contact with the corresponding contact faces of receptacles, resulting in an assembled component that is tight and solid, with no looseness or rattles. Alternatively, this can be achieved by using an interference fit wherein the protruding object (cone, tab, etc.) is slightly larger in outside dimension than the interior dimension of the corresponding receptacle.

Cones and tabs are used in the preferred embodiment of the invention, although pegs, interlocking pegs, snaps, locking lips or other means (such as protruding means and receptacle means) for joining two partial shells 101a could also be used. Cones tend to provide equally stiff fastening forces in all directions, while the tabs as shown tend to be stiffer in the longitudinal direction (due to its greater length) of the tube than in other directions. Therefore a combination of cones and tabs was thought to be most advantageous. In the preferred embodiment, protruding means and receptacle means are located on every joining face 507 or edge of each partial shell which is to be assembled with another component.

When the protruding means and receptacle means are used as described to assemble the bicycle frame 100, the various partial shells are joined to form complete shells, and the various partial shells are prevented from sliding relative to one another in any direction in the joining plane. When the two partial shells are joined, they are also prevented from moving apart orthogonal to the joining plane by using a bonding means on the joining faces 507 and on the protruding means and receptacle means. The bonding means may be epoxy, glue, adhesive, welding (such as ultrasonic plastic welding or friction plastic welding) or other suitable bonding means. Another means for firmly engaging any two assemblable parts of the invention is to construct the corresponding parts with a slight lip on any or all of their protrusions, so that the protrusion must bend slightly when being joined. Thus, at the conclusion of joining the lip snaps over a ledge in the receptacle. The lip and ledge arrangement prevents the disengagement of the protrusion from its receptacle similar to the manner in which the barb on a fish hook causes the hook to resist disengagement from tissue. Using the above-described structure, the resulting joined shell acts structurally as a single monocoque shell.

The use of protruding means and receptacle means also has the advantage of substantially increasing the available adhesive bond surface area compared to the bonding area that would be available if flat, protrusion-less joining faces 507 were used. A stronger adhesive bond results. The use of protrusion means and receptacle means also has the advantage of firmly guiding the partial shells together in the precisely correct orientation during assembly, so that a precise match of skin 506 edges is achieved and so that the joining seams are more obscure.

Placement of the protruding means and receptacle means on the shell skin 506a results in a higher strength frame tubing than would be achieved from placement of the protruding means and receptacle means on the interior 505 of the partial shell 101a. As the distance of the protruding (or other fastening) means from the center of the tube increases, the ability of the tube to withstand torque (i.e. torsional loading) is increased.

Figure 6:
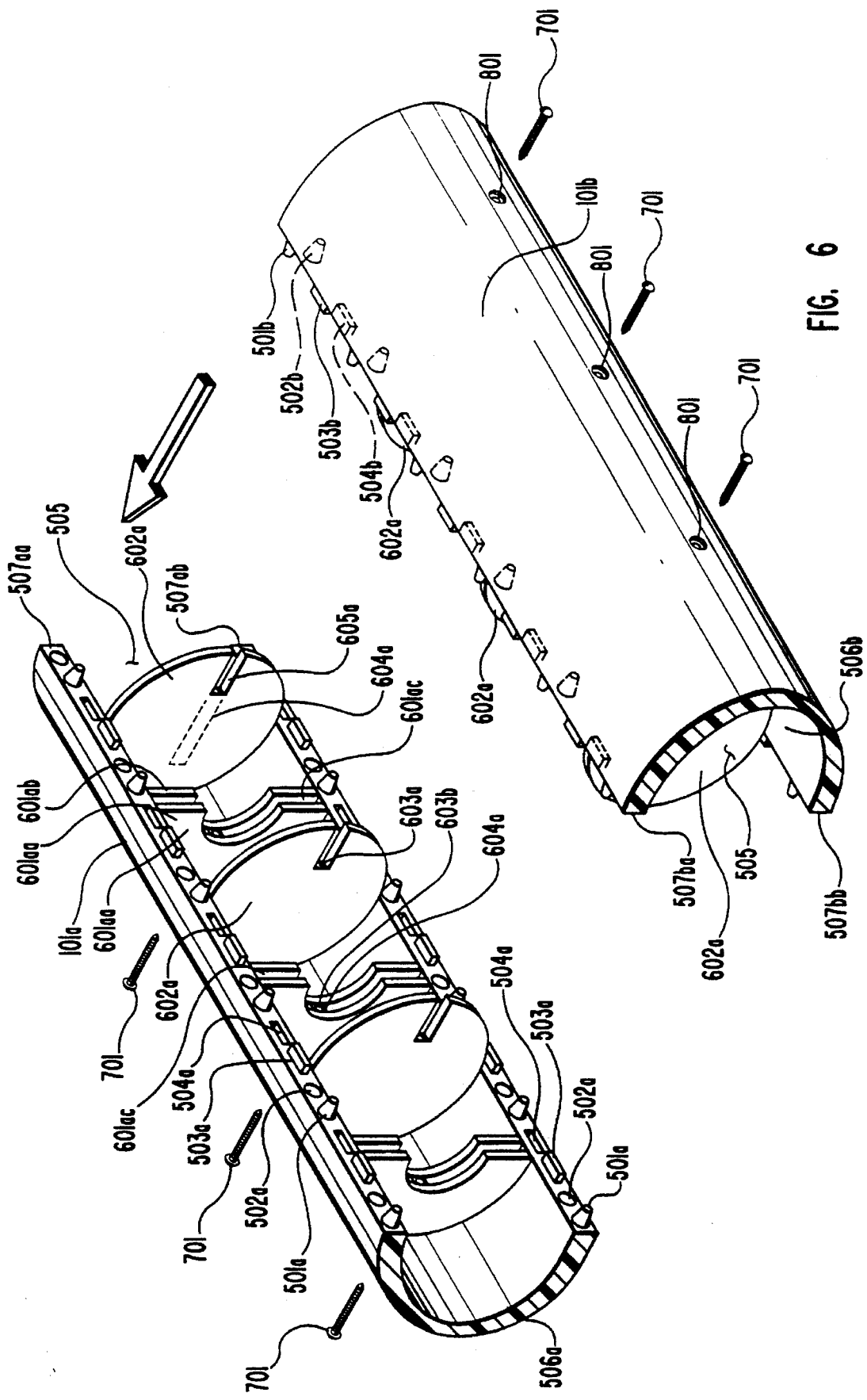
FIG. 6 depicts a section of another preferred embodiment a partial (half) shell of the top tube depicted in FIGS. 1–4.

FIG. 6 depicts another preferred embodiment of the invention that, compared to the embodiment of FIG. 5, can be used to achieve an assembled component with even greater resistance to sliding movement in the joining plane and even greater resistance to the pulling apart of the partial shells orthogonal to the joining plane. FIG. 6 shows protrusions and receptacles within the interior 505 hollow of the shell. In the embodiment shown, the protrusions and receptacles are tang 602 and clevis 601. The protrusions and receptacles in the interior 505 of the shell could be any protruding means and receptacles means, however, such as cones, tabs, pegs, snaps, and others.

As shown, the tang 602a of one partial shell 101a fits into the clevis 601b of the corresponding partial shell. The tang 602a used is a circular member molded into to the tube wall 506a of one partial shell 101a, the circular member occupying substantially the entire diameter of the interior of the tube 505. The clevis 601a used is a two-part clevis with a proximal wall 601aa and a distal wall 601ab, the proximal and distal walls 601aa and 601ab being spaced and adapted to receive a tang 602b into their interstitial space 601ac and hold the tang 602b firmly therein. Bonding means may be used on the contact surface between tang and clevis to reinforce any frictional engagement therebetween. The interlock between tang and clevis further prevents sliding in any direction of the joining plane, and provides additional adhesive bond area for preventing pulling apart of the two partial shells orthogonal to the joining plane.

FIG. 6 also shows that optional additional reinforcing fastening means may be used to attach the two partial shells 101a and 101b. Each tang 602a includes a fastener boss 604a that has a fastener hole 603a. A corresponding fastener hole is found on the clevis 603b in the area of a clevis wall anchor 604a. The clevis wall anchor 604a provides reinforcement between clevis walls 601aa and 601ab. A corresponding clevis-wall-anchor-gap 605a is provided on each tang 602 to accommodate the geometry of the clevis 601 and clevis wall anchor 604. The optional additional fastening means (such as bolts, rivets, screws, pins, nails and others) extend from one partial shell 101a into another through fastener holes 603a and 603b to mount into fastener boss 604a. In the embodiment shown screws as used are the fastening means that fit through fastener hole 603b in the clevis 601, then through fastener hole 603a in the tang 602 so that it can self-tap into the fastener boss 604a. The screw is inserted in the exterior of the shell wall 506a, and is prevented from going through the clevis by the use of a screw head that is larger than the fastener hole 603b in the clevis. This is illustrated further in FIGS. 7–10.

Although not shown in FIG. 6, a longitudinal reinforcing rib may be placed on the interior 505 of the partial shell. The reinforcing rib would typically be placed equidistant from the joining faces 507aa and 507ab on the interior 505 of the shell. The rib would run from clevis 601a to tang 602a, typically along the entire length of the tube wall 506a. The purpose of the reinforcing rib would be to increase the stiffness of the partial shell 101a in its longitudinal direction so that it would have less tendency to flex during assembly. This would permit greater spacing of tang and clevis along the tube wall and greater spacing of the cones and tabs on the joining faces, while still achieving partial shells that are easy to assemble. Alternatively, reinforcing ribs can be put anywhere and in any orientation in the interior 505 to increase strength and stiffness to meet a particular design need.

Figure 7:
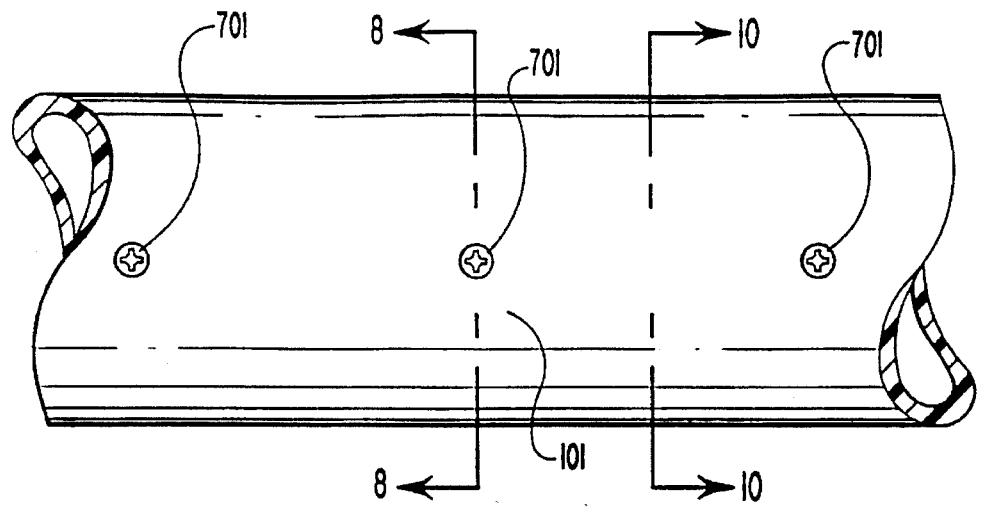
FIG. 7 depicts a side view of another preferred embodiment of the partial (half) shell of the top tube depicted in FIGS. 1–5.
Figure 8:
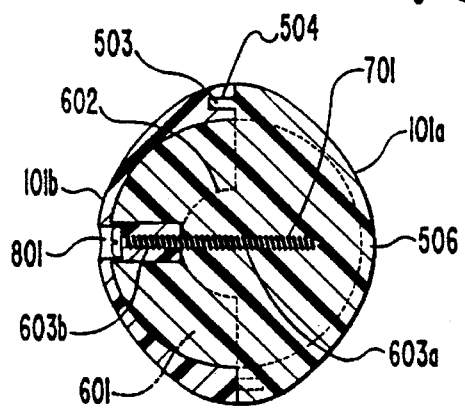
FIG. 8 depicts a cross section at 8—8 (assembled) of the embodiment of the partial (half) shell of the top tube depicted in FIG. 7.
Figure 10:
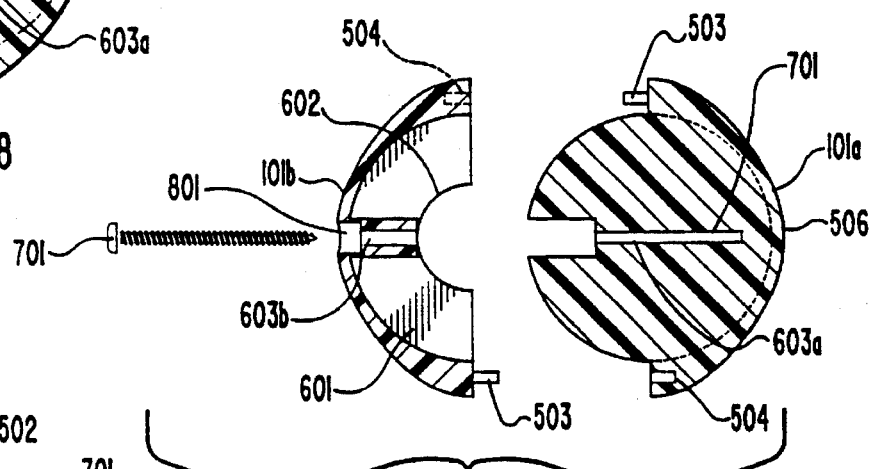
FIG. 10 depicts a cross section at 9—9 (assembled) of the embodiment of the partial (half) shell of the top tube depicted in FIGS. 7–9.
Figure 9:
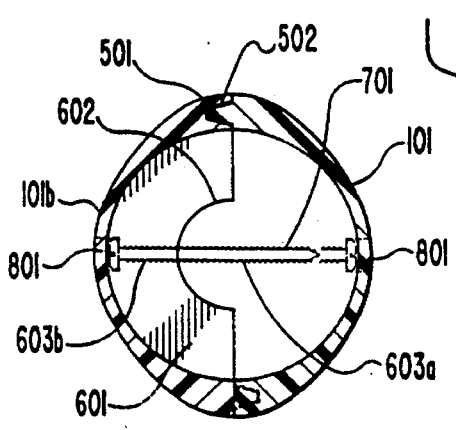
FIG. 9 depicts a cross section at 10—10 (before assembly) of the embodiment of the partial (half) shell of the top tube depicted in FIGS. 7 and 8.

FIG. 7 shows a side view of the top tube 101. Screw heads 701 of screws that are serving as reinforcing fastening means are visible. FIG. 8 shows a cross section of the top tube 101 at section 8—8 when assembled. Note that FIG. 8 reveals top tube 101 to be oval in cross section because the tube wall 506 is thicker in the area of the tabs 503 and cones 501. In alternative embodiments, any of the tubes of the frame 100 could be round, oval, egg-shaped, tear-drop shaped, square, octagonal, or otherwise in cross section, depending on the characteristics of the tube desired. In FIG. 8, it can be seen how the tang 602 and clevis arrangement joins together. Joining of the tab 503 and tab receptacles 504 is also shown. Screw 701 is shown reinforcing joining of the two partial shells 101a and 101b. A countersink 801 is provided so that the head of the screw 701 can be partially hidden from view. FIG. 10 shows the elements of FIG. 8 prior to assembly. FIG. 9 shows a cross section of the top tube 101 at section 10—10.

As can be seen from the drawings and accompanying description, the invention provides a frame constructed from a number of partial shells which, when joined together, behave as a complete single shell (i.e. a monocoque shell). The partial shells of the monocoque shell resist sliding and movement in any direction along their joining plane. The partial shells also resist pulling or splitting apart from each other in a direction orthogonal to the joining plane of the seam. This combination eliminates all degrees of freedom of the partial shells with respect to one another, forcing them to behave as though they were a single integrated piece with no seam or separate assembled components.

b. The Frame Adapted for Other Human-powered Vehicles

The frame described in the preferred embodiment above is a mountain bike frame. In other embodiments of the invention, frames could be constructed for road bicycles, wheelchairs, hang gliders, sail boards as well as other human-powered vehicles. It would also be possible to use the invention for some motorized vehicles, such a mopeds, ultra-light airplanes, motorized wheelchairs, go-carts and others.

c. Method for Making the Frame

In the preferred embodiment, the frame comprises a plurality of partial shells which are injection molded and then joined with bonding means on the protruding means and receptacle means to achieve the invented frame. In the preferred embodiment, the partial shells will be molded from a composite material which will typically be a combination of structural fiber (glass, carbon, aramid, etc.) and a structural thermoplastic (such as polyamide, polyphenaline sulfide, high density polyethylene, polypropylene, polyester teraphalate, acrylobutadiene styrene, polycarbonate, etc.), as opposed to a thermoset plastic. In the preferred embodiment, standard modulus moderate strength graphite (carbon) fiber known as TORAY T-700 graphite and NYLON 6-6 thermoplastic are used. Other fibers and thermoplastic available commercially could be used as well. The partial shells could also be manufactured from thermoplastic without reinforcing fibers, injectable metals, injectable quick-setting fiber-reinforced thermoset plastics, or any other injectable, quickly solidifying structural material. A particular advantage of the material used in the preferred embodiment is that it results in a frame that inherently dampens shock and thus provides a comfortable ride to the rider. Injection molding in the preferred embodiment takes place at 10,000 to 30,000 pounds per square inch of pressure so that no voids will result in the molded component. This is an important advance over prior art low-pressure molding, such as the inflation-cured shells described earlier, because the voids left with low-pressure molding resulted in unpredictably weak components and component failure. On a vehicle that undergoes rigorous use, such a mountain bike, unpredictable failure can be dangerous.

The general steps of the process include procuring a mold shaped to mold a component with the desired structural characteristics (such as those described above), injecting a fiber-reinforced thermoplastic into the mold under a pressure of 10,000 to 30,000 p.s.i. to cause the thermoplastic to fill the entire cavity of the mold, splitting apart the two mold halves from each other so that the molded component may be removed from the mold, and joining together a plurality of such molded components into a vehicle frame, using bonding means to result in a frame that behaves as a monocoque frame. Optionally, welding of seams and installation of reinforcing fastening means (such as screws, bolts, rivets, etc.) may be performed. Finishing steps may be employed as well, such as sanding, painting, etc.

d. Advantages of the Frame Over the Prior Art

The preferred embodiments of the invention described above illustrate how the invention achieves the object of the invention and how the invention is advantageous over the prior art.

The invented method for manufacturing a frame for a human-powered vehicle can be used to produce large quantities of frames rapidly at a very low cost. Injection molding is well known in the art as a very low labor and low cost process. Partial shells that make up the invented frame can be injection molded by a single laborer at the rate of approximately one per minute. Labor costs to assemble the partial shells into a frame are minimal because the protrusions act as a firm guide in precisely aligning the partial shells for quick, foolproof assembly. This reduces labor costs substantially over prior art methods. Minor clamping pressure, or the pressure caused by the fasteners (i.e. screws, bolts, etc.), is adequate to hold the partial shells precisely aligned together in correct position during curing of the bonding means without the need for expensive jigs or other fixturing. The cost of fiber-filled structural thermoplastic injection moldable materials used in the invention is generally less than the cost of fiber/thermoset-resin composite materials, and compares favorably with metal alloys commonly currently used in lightweight human-powered vehicle frames (such as in bicycles and wheelchairs). The extremely low labor cost, combined with the favorable material costs, results in a low cost frame.

The invented frame also has definite weight advantages over prior art frames. At the angles and bends of the invented frame, the injection moldable fiber-reinforced plastic material flows around without discontinuity such as is found in the joints of a welded-tube or tube-and-lug frame. Thus additional, heavy build-up is unnecessary at the angles and bends of the invented frame. And unlike inflation-cured shells, there is no excess build-up of materials at the angles and bends. The injection molding art is well known to be able to control part thickness such that every area of the frame can have the optimum design thickness for its required strength characteristics, but without any excess, thus saving weight.

The invented frame also results in an aesthetically attractive frame. The completed assembled frame of the invention can be designed to have the same attractive appearance (i.e. free flowing lines) as the heavier, more expensive inflation-cured monocoque shell frames. Various shapes for the tubing of the invented frame can be chosen as well, whether for appearance or aerodynamic considerations.

The invented frame is also free of exposed edges, areas which trap dirt, mud, and debris, and it is easy to clean. The closed and complete shell tubing of the invention adds torsional strength and stiffness over prior art designs. Unlike the similarly light and inexpensive truss structure frames, the invented frame uses partial shells are joined in such a fashion that a complete shell without unprotected openings results. The frame has no exposed thin edges for greater damage resistance, and no areas which tend to trap dirt, mud, and debris, and thus cleaning the frame is easy.

The invented frame characteristics and manufacturing process can be used to manufacture principle structural members of lightweight vehicles other than the frame. For example, a bicycle handlebar can be made from two half shells of the invention which join to make a resulting tubular handlebar. A rigid wheel can be made from a right half shell and a left half shell which join to form a wheel complete with tire rim. Any other structural members of lightweight human-powered vehicles which are otherwise made by the three prior art methods mentioned above (i.e. (1) Joined tubing, (2) inflation cured shells, and (3) truss structures) can be made once the invention is known. For example, the characteristics of the invention can be employed to manufacture wheelchair foot rests, wheelchair back rests, wheelchair side frames, hang glider wing frames, and others.

Although the preferred embodiments described above utilize structurally complete shells that have smooth exteriors without exposed openings, not every portion of the invented frame need be joined into a complete shell to be considered within the scope of the invention, as long as some portions of the frame are complete. For example, in FIG. 3, the bicycle would be functional with just the left and right main shells joined, and the four inner seat and chain stays omitted. The four inner seat and chain stays are preferred for an attractive appearance, added structural strength, elimination of sharp edges, avoidance of trapped mud, etc. Another example is handlebars. Handlebars made with the characteristics of the invention could be open at their ends, thus not being a completely closed shell.

We claim:

1. A lightweight structural component for a human-powered vehicle, the structural component comprising:

a first partial shell, said first partial shell having a proximal side and a distal surface, a second partial shell, said second partial shell having a proximal side and a distal surface, said first and second partial shells being joined to form an assembled tube, an outer tube skin on said distal surface of each of said partial shells, said outer tube skins forming an exterior surface of the assembled tube, an interior cavity located on the proximal side of each partial shell, said interior cavities each having a volume that is substantially hollow, first and second joining faces located along the length of each of said partial shells near its outer skin, said first joining face of said first partial shell being in firm contact with said first joining face of said second partial shell in the assembled tube, and said second joining face of said first partial shell being in firm contact with said second joining face of said second partial shell in the assembled tube, and a plurality of protruding means located along a joining face of said first partial shell and a plurality of receptacle means located on a corresponding joining face of said second partial shell, said protruding means being arranged to protrude into said receptacle means and engage therewith in the assembled tube;

wherein said assembled tube has a first seam where said first joining face of said first partial shell meets said first joining face of said second partial shell;

wherein said assembled tube has a second seam where said second joining face of said first partial shell meets said second joining face of said second partial shell;

wherein said first seam and said second seam define a plane referred to as the joining plane;

wherein said engaged protruding means and receptacle means prevent movement of said first partial shell with respect to said second partial shell in any direction on the joining plane;

wherein said protruding means and said receptacle means have bonding means on their surfaces to keep said first and second partial shells firmly engaged with each other in the assembled tube and to prevent movement of said first partial shell with respect to said second partial shell in a direction generally orthogonal to the joining plane; and wherein said structural component is manufactured from a composition of reinforcing fibers and thermoplastic.

2. A structural component as recited in claim 1 wherein said structural component is manufactured by injection molding.

3. A lightweight structural component for a human-powered vehicle, the structural component comprising:

a first partial shell, said first partial shell having a proximal side and a distal surface, a second partial shell, said second partial shell having a proximal side and a distal surface, said first and second partial shells being joined to form an assembled tube, an outer tube skin on said distal surface of each of said partial shells, said outer tube skins forming an exterior surface of the assembled tube, an interior cavity located on the proximal side of each partial shell, said interior cavities each having a volume that is substantially hollow, first and second joining faces located along the length of each of said partial shells near its outer skin, said first joining face of said first partial shell being in firm contact with said first joining face of said second partial shell in the assembled tube, and said second joining face of said first partial shell being in firm contact with said second joining face of said second partial shell in the assembled tube, and a plurality of protruding means located along a joining face of said first partial shell and a plurality of receptacle means located on a corresponding joining face of said second partial shell, said protruding means being arranged to protrude into said receptacle means and engage therewith in the assembled tube a plurality of internal protruding means and a plurality of internal receptacle means located on the proximal side of each of said partial shells, said internal protruding means located on said proximal side of said first partial shell being arranged to protrude into said internal receptacle means located on the proximal side of said second partial shell and to engage therewith, and said internal protruding means located on said proximal side of said second partial shell being arranged to protrude into said internal receptacle means located on the proximal side of said first partial shell and to engage therewith;

wherein said assembled tube has a first seam where said first joining face of said first partial shell meets said first joining face of said second partial shell;

wherein said assembled tube has a second seam where said second joining face of said first partial shell meets said second joining face of said second partial shell;

wherein said first seam and said second seam define a plane referred to as the joining plane;

wherein said engaged protruding means and receptacle means prevent movement of said first partial shell with respect to said second partial shell in any direction on the joining plane; and wherein at least one of said protruding means comprises a tang and at least one of said receptacle means comprises a clevis, said clevis being structurally configured to receive and to firmly engage said tang.

4. A structural component as recited in claim 3 wherein said tang has a cross-sectional configuration resembling the assembled tube and said clevis is configured as a two-part clevis with a proximal clevis wall and a distal clevis wall, the proximal and distal clevis walls having an interstitial space between them, said clevis walls being adapted to receive said tang; and wherein said tang and clevis are adapted to prevent movement of said first partial shell with respect to second partial shell in any direction in the joining plane.

5. A structural component as recited in claim 4 wherein said tang and said clevis have bonding means on their contact surfaces to keep said first and second partial shells firmly engaged with each other in the assembled tube and to prevent movement of said first partial shell with respect to said second partial shell in a direction generally orthogonal to the joining plane.

6. A structural component as recited in claim 5 further comprising reinforcing fastening means installed on said assembled tube, said reinforcing fastening means extending through a clevis and into a tang to provide additional structure that prevents movement of said first partial shell with respect to said second partial shell in any direction in the joining plane and in a direction generally orthogonal to said joining plane; wherein said reinforcing fastening means comprises screws.

7. A lightweight structural component for a human-powered vehicle, the structural component comprising:

a first partial shell, said first partial shell having a proximal side and a distal surface, a second partial shell, said second partial shell having a proximal side and a distal surface, said first and second partial shells being joinable to form an assembled tube, an outer tube skin on said distal surface of each of said partial shells, said outer tube skins forming an exterior surface of the assembled tube, an interior cavity located on the proximal side of each partial shell, each of said interior cavities having a volume that is substantially hollow, first and second joining faces located along the length of each of said partial shells near its outer skin, said first joining face of said first partial shell being in firm contact with said first joining face of said second partial shell when the assembled tube is assembled, and said second joining face of said first partial shell being in firm contact with said second joining face of said second partial shell when the assembled tube is assembled, and a plurality of protruding means located along a joining face of said first partial shell and a plurality of receptacle means located on a corresponding joining face of said second partial shell, said protruding means being arranged to protrude into said receptacle means and engage therewith when the assembled tube is assembled;

wherein assembly of said first and second partial shells into said assembled tube results in said assembled tube that has a first seam where said first joining face of said first partial shell meets said first joining face of said second partial shell;

wherein assembly of said first and second partial shells into said assembled tube results in said assembled tube that has a second seam where said second joining face of said first partial shell meets said second joining face of said second partial shell;

wherein said first seam and said second seam define a plane referred to as a joining plane;

wherein assembly of said first and second partial shells into said assembled tube results in said assembled tube that has engaged protruding means and receptacle means which prevent movement of said first partial shell with respect to said second partial shell in any direction on the joining plane;

wherein said first partial shell and said second partial shell further comprise a plurality of internal protruding means and a plurality of internal receptacle means located on the proximal side of each of said partial shells, said internal protruding means located on said proximal side of said first partial shell being arranged to protrude into said internal receptacle means located on the proximal side of said second partial shell and to engage therewith in the assembled tube, and said internal protruding means located on said proximal side of said second partial shell being arranged to protrude into said internal receptacle means located on the proximal side of said first partial shell and to engage therewith in the assembled tube; and wherein at least one of said protruding means comprises a tang and at least one of said receptacle means comprises a clevis, said clevis being structurally configured to receive and to firmly engage said tang in the assembled tube.

8. A structural component as recited in claim 7 wherein said tang is configured in cross-sectional shape like the assembled tube and said clevis is configured as a two-part clevis with a proximal clevis wall and a distal clevis wall, the proximal and distal clevis walls having an interstitial space between them, said clevis walls being adapted to receive said tang; and wherein said tang and clevis are adapted to prevent movement of said first partial shell with respect to second partial shell in any direction in the joining plane in the assembled tube.

9. A structural component as recited in claim 8 wherein said tang and said clevis have bonding means on their contact surfaces to keep said first and second partial shells firmly engaged with each other in the assembled tube and to prevent movement of said first partial shell with respect to said second partial shell in a direction generally orthogonal to the joining plane.

10. A structural component as recited in claim 8 further comprising reinforcing fastening means installed on the assembled tube, said reinforcing fastening means extending through a clevis and into a tang to provide additional structure that prevents movement of said first partial shell with respect to said second partial shell in any direction in the joining plane in the assembled tube and in a direction generally orthogonal to said joining plane in the assembled tube; wherein said reinforcing fastening means comprises screws.

11. A structural component as recited in claim 10 wherein said protruding means and said receptacle means are situated on said assembled tube in locations that maximize the ability of said assembled tube to resist torsional forces.

12. A lightweight bicycle frame constructed from a plurality of tubes arranged with and attached to each other in a configuration of a bicycle frame, at least one of the tubes of the bicycle frame comprising:

a first partial shell, said first partial shell having a proximal side and a distal surface, a second partial shell, said second partial shell having a proximal side and a distal surface, said first and second partial shells being joined to form an assembled tube, an outer tube skin on said distal surface of each of said partial shells, said outer tube skins forming an exterior surface of the assembled tube, an interior cavity located on the proximal side of each partial shell, said interior cavities being substantially hollow, first and second joining faces located along the length of each of said partial shells near its outer skin, said first joining face of said first partial shell being in firm contact with said first joining face of said second partial shell in the assembled tube, and said second joining face of said first partial shell being in firm contact with said second joining face of said second partial shell in the assembled tube, a plurality of protruding means located along a joining face of said first partial shell and a plurality of receptacle means located on a corresponding joining face of said second partial shell, said protruding means being arranged to protrude into said receptacle means and engage therewith in the assembled tube;

wherein said assembled tube has a first seam where said first joining face of said first partial shell meets said first joining face of said second partial shell;

wherein said assembled tube has a second seam where said second joining face of said first partial shell meets said second joining face of said second partial shell;

wherein said first seam and said second seam define a plane referred to as the joining plane;

wherein said engaged protruding means and receptacle means prevent movement of said first partial shell with respect to said second partial shell in any direction on the joining plane; and wherein said partial shells are manufactured from a composition of reinforcing fibers and thermoplastic.

13. A bicycle frame as recited in claim 12 wherein said partial shells are manufactured by injection molding.

14. A lightweight bicycle frame constructed from a plurality of tubes arranged with and attached to each other in a configuration of a bicycle frame, at least one of the tubes of the bicycle frame comprising:

a first partial shell, said first partial shell having a proximal side and a distal surface, a second partial shell, said second partial shell having a proximal side and a distal surface, said first and second partial shells being joined to form an assembled tube, an outer tube skin on said distal surface of each of said partial shells, said outer tube skins forming an exterior surface of the assembled tube, an interior cavity located on the proximal side of each partial shell, said interior cavities being substantially hollow, first and second joining faces located along the length of each of said partial shells near its outer skin, said first joining face of said first partial shell being in firm contact with said first joining face of said second partial shell in the assembled tube, and said second joining face of said first partial shell being in firm contact with said second joining face of said second partial shell in the assembled tube, and a plurality of protruding means located along a joining face of said first partial shell and a plurality of receptacle means located on a corresponding joining face of said second partial shell, said protruding means being arranged to protrude into said receptacle means and engage therewith in the assembled tube;

wherein said assembled tube has a first seam where said first joining face of said first partial shell meets said first joining face of said second partial shell;

wherein said assembled tube has a second seam where said second joining face of said first partial shell meets said second joining face of said second partial shell;

wherein said first seam and said second seam define a plane referred to as the joining plane;

wherein said engaged protruding means and receptacle means prevent movement of said first partial shell with respect to said second partial shell in any direction on the joining plane;

wherein said protruding means and said receptacle means are shaped to guide said first partial shell and said second partial shell into proper alignment with each other during assembly;

wherein each of said protruding means has a contact surface for contacting said receptacle means, and each of said receptacle means has a contact surface for contacting said protruding means; and wherein the contact surfaces of said protruding means are configured to be at a slightly greater angle from their center axis than the corresponding contact surfaces of said receptacle means, so that in said assembled tube said protruding means contact surfaces are in firm, pressurized contact with the corresponding contact surfaces of said receptacle means.

15. A lightweight bicycle frame constructed from a plurality of tubes arranged with and attached to each other in a configuration of a bicycle frame, at least one of the tubes of the bicycle frame comprising:

a first partial shell, said first partial shell having a proximal side and a distal surface, a second partial shell, said second partial shell having a proximal side and a distal surface, said first and second partial shells being joined to form an assembled tube, an outer tube skin on said distal surface of each of said partial shells, said outer tube skins forming an exterior surface of the assembled tube, an interior cavity located on the proximal side of each partial shell, said interior cavities being substantially hollow, first and second joining faces located along the length of each of said partial shells near its outer skin, said first joining face of said first partial shell being in firm contact with said first joining face of said second partial shell in the assembled tube, and said second joining face of said first partial shell being in firm contact with said second joining face of said second partial shell in the assembled tube, and a plurality of protruding means located along a joining face of said first partial shell and a plurality of receptacle means located on a corresponding joining face of said second partial shell, said protruding means being arranged to protrude into said receptacle means and engage therewith in the assembled tube;

wherein said assembled tube has a first seam where said first joining face of said first partial shell meets said first joining face of said second partial shell;

wherein said assembled tube has a second seam where said second joining face of said first partial shell meets said second joining face of said second partial shell;

wherein said first seam and said second seam define a plane referred to as the joining plane;

wherein said engaged protruding means and receptacle means prevent movement of said first partial shell with respect to said second partial shell in any direction on the joining plane; and wherein one of said joining faces is situated at a point on said exterior surface of the assembled tube, said one joining face being at about a 45 degree to 135 degree angle to the tangent of said exterior surface of the assembled tube at the point where said joining face and exterior surface meet.

16. A lightweight bicycle frame constructed from a plurality of tubes arranged with and attached to each other to form a bicycle frame, at least one of the tubes of the bicycle frame comprising:

a first partial shell, said first partial shell having a proximal side and a distal surface, a second partial shell, said second partial shell having a proximal side and a distal surface, said first and second partial shells being joined to form an assembled tube, an outer tube skin on said distal surface of each of said partial shells, said outer tube skins forming an exterior surface of the assembled tube, an interior cavity located on the proximal side of each partial shell, first and second joining faces located along the length of each of said partial shells near its outer skin, said first joining face of said first partial shell being in firm contact with said first joining face of said second partial shell in the assembled tube, and said second joining face of said first partial shell being in firm contact with said second joining face of said second partial shell in the assembled tube, and a plurality of protruding means located along a joining face of said first partial shell and a plurality of receptacle means located on a corresponding joining face of said second partial shell, said protruding means being arranged to protrude into said receptacle means and engage therewith in the assembled tube;

wherein said assembled tube has a first seam where said first joining face of said first partial shell meets said first joining face of said second partial shell;

wherein said assembled tube has a second seam where said second joining face of said first partial shell meets said second joining face of said second partial shell;

wherein said first seam and said second seam define a plane referred to as the joining plane;

wherein said engaged protruding means and receptacle means prevent movement of said first partial shell with respect to said second partial shell in any direction on the joining plane; and wherein one of said joining faces is situated at a point on said exterior surface of the assembled tube, said one joining face being at about a 60 degree to 120 degree angle to the tangent of said exterior surface of the assembled tube at the point where said joining face and exterior surface meet.

17. A lightweight bicycle frame constructed from a plurality of tubes arranged with and attached to each other in a configuration of a bicycle frame, at least one of the tubes of the bicycle frame comprising:

a first partial shell, said first partial shell having a proximal side and a distal surface, a second partial shell, said second partial shell having a proximal side and a distal surface, said first and second partial shells being joined to form an assembled tube, an outer tube skin on said distal surface of each of said partial shells, said outer tube skins forming an exterior surface of the assembled tube, an interior cavity located on the proximal side of each partial shell, said inner cavities being substantially hollow, first and second joining faces located along the length of each of said partial shells near its outer skin, said first joining face of said first partial shell being in firm contact with said first joining face of said second partial shell in the assembled tube, and said second joining face of said first partial shell being in firm contact with said second joining face of said second partial shell in the assembled tube, and a plurality of protruding means located along a joining face of said first partial shell and a plurality of receptacle means located on a corresponding joining face of said second partial shell, said protruding means being arranged to protrude into said receptacle means and engage therewith in the assembled tube;

wherein said assembled tube has a first seam where said first joining face of said first partial shell meets said first joining face of said second partial shell;

wherein said assembled tube has a second seam where said second joining face of said first partial shell meets said second joining face of said second partial shell;

wherein said first seam and said second seam define a plane referred to as the joining plane;

wherein said engaged protruding means and receptacle means prevent movement of said first partial shell with respect to said second partial shell in any direction on the joining plane; and wherein one of said joining faces is situated at a point on said exterior surface of the assembled tube, said one joining face being at about an 80 degree to 110 degree angle to the tangent of said exterior surface of the assembled tube at the point where said joining face and said exterior surface meet.

18. A lightweight bicycle frame constructed from a plurality of tubes arranged with and attached to each other in a configuration of a bicycle frame, at least one of the tubes of the bicycle frame comprising:

a first partial shell, said first partial shell having a proximal side and a distal surface, a second partial shell, said second partial shell having a proximal side and a distal surface, said first and second partial shells being joined to form an assembled tube, an outer tube skin on said distal surface of each of said partial shells, said outer tube skins forming an exterior surface of the assembled tube, an interior cavity located on the proximal side of each partial shell, said interior cavities being substantially hollow, first and second joining faces located along the length of each of said partial shells near its outer skin, said first joining face of said first partial shell being in firm contact with said first joining face of said second partial shell in the assembled tube, and said second joining face of said first partial shell being in firm contact with said second joining face of said second partial shell in the assembled tube, and a plurality of protruding means located along a joining face of said first partial shell and a plurality of receptacle means located on a corresponding joining face of said second partial shell, said protruding means being arranged to protrude into said receptacle means and engage therewith in the assembled tube;

wherein said assembled tube has a first seam where said first joining face of said first partial shell meets said first joining face of said second partial shell;

wherein said assembled tube has a second seam where said second joining face of said first partial shell meets said second joining face of said second partial shell;

wherein said first seam and said second seam define a plane referred to as the joining plane;

wherein said engaged protruding means and receptacle means prevent movement of said first partial shell with respect to said second partial shell in any direction on the joining plane;

wherein said tube further comprises a plurality of internal protruding means and a plurality of internal receptacle means located on the proximal side of each of said partial shells, said internal protruding means located on said proximal side of said first partial shell being arranged to protrude into said internal receptacle means located on the proximal side of said second partial shell and to engage therewith, and said internal protruding means located on said proximal side of said second partial shell being arranged to protrude into said internal receptacle means located on the proximal side of said first partial shell and to engage therewith; and wherein at least one of said protruding means comprises a tang and at least one of said receptacle means comprises a clevis, said clevis being structurally configured to receive and to firmly engage said tang.

19. A bicycle frame as recited in claim 18 wherein said tang is configured in cross-sectional shape like the assembled tube and said clevis is configured as a two-part clevis with a proximal clevis wall and a distal clevis wall, the proximal and distal clevis walls having an interstitial space between them, said clevis walls being adapted to receive said tang; and wherein said tang and clevis are adapted to prevent movement of said first partial shell with respect to second partial shell in any direction in the joining plane.

20. A bicycle frame as recited in claim 19 wherein said tang and said clevis have bonding means on their contact surfaces to keep said first and second partial shells firmly engaged with each other in the assembled tube and to prevent movement of said first partial shell with respect to said second partial shell in a direction generally orthogonal to the joining plane.

21. A bicycle frame as recited in claim 19 further comprising reinforcing fastening means installed on said assembled tube, said reinforcing fastening means extending through a clevis and into a tang to provide additional structure that prevents movement of said first partial shell with respect to said second partial shell in any direction in the joining plane and in a direction generally orthogonal to said joining plane; wherein said reinforcing fastening means comprises screws.

22. A bicycle frame as recited in claim 21 wherein said protruding means and said receptacle means are situated on said assembled tube in locations that maximize the ability of said assembled tube to resist torsional forces.

23. A lightweight bicycle frame constructed from a plurality of tubes arranged with and attached to each other in a configuration of a bicycle frame, the bicycle frame comprising:

a top tube having a proximal and a distal end, a head attached to the distal end of said top tube, a down tube having a proximal and a distal end, the distal end of said down tube being attached to said head, a seat tube having a proximal and a distal end, the proximal end of said seat tube being attached to the proximal end of said top tube, and the distal end of said seat tube being attached to the proximal end of said down tube, a chain stay having a proximal and a distal end, the proximal end of said chain stay being attached to the distal end of said seat tube, and a seat stay having a proximal and a distal end, the proximal end of said seat stay being attached to the proximal end of said seat tube;

wherein the distal end of said seat stay is attachable to the distal end of said chain stay by a rear axle dropout;

wherein at lest one of said tubes of said bicycle frame comprises a lightweight structural component comprising:

a first partial shell, said first partial shell having a proximal side and a distal surface, a second partial shell, said second partial shell having a proximal side and a distal surface, said first and second partial shells being joined to form an assembled tube, an outer tube skin on said distal surface of each of said partial shells, said outer tube skins forming an exterior surface of the assembled tube, an interior cavity located on the proximal side of each partial shell, said interior cavities being substantially hollow, first and second joining faces located along the length of each of said partial shells near its outer skin, said first joining face of said first partial shell being in firm contact with said first joining face of said second partial shell in the assembled tube, and said second joining face of said first partial shell being in firm contact with said second joining face of said second partial shell in the assembled tube, a plurality of protruding means located along a joining face of said first partial shell and a plurality of receptacle means located on a corresponding joining face of said second partial shell, said protruding means being arranged to protrude into said receptacle means and engage therewith in the assembled tube, and a tang on one of said partial shells and a clevis on another of said partial shells, said clevis being structurally configured to receive and to firmly engage said tang in the assembled tube;

wherein said assembled tube has a first seam where said first joining face of said first partial shell meets said first joining face of said second partial shell;

wherein said assembled tube has a second seam where said second joining face of said first partial shell meets said second joining face of said second partial shell;

wherein said first seam and said second seam define a plane referred to as the joining plane; and wherein said engaged protruding means and receptacle means prevent movement of said first partial shell with respect to said second partial shell in any direction on the joining plane.

24. A bicycle frame as recited in claim 23 wherein said tang is configured in a general cross-sectional shape of the assembled tube of said structural component and said clevis is configured as a two-part clevis with a proximal clevis wall and a distal clevis wall, the proximal and distal clevis walls having an interstitial space between them, said clevis walls being adapted to receive said tang; and wherein said tang and clevis are adapted to prevent movement of said first partial shell with respect to second partial shell in any direction in the joining plane.

25. A bicycle means as recited in claim 23 where said structural component further comprises reinforcing fastening means installed on said assembled tube, said reinforcing fastening means extending through an inner receptacle-means and into an inner protruding means to provide additional structure that prevents movement of said first partial shell with respect to said second partial shell in any direction in the joining plane and in a direction generally orthogonal to said joining plane; wherein said reinforcing fastening means comprises screws.

26. A bicycle frame as recited in claim 24 further comprising reinforcing fastening means installed on said assembled tube of said structural component, said reinforcing fastening means extending through a clevis and into a tang to provide additional structure that prevents movement of said first partial shell with respect to said second partial shell in any direction in the joining plane and in a direction generally orthogonal to said joining plane; wherein said reinforcing fastening means comprises screws.

* * * * *